(12) United States Patent
Ellinghuysen

(10) Patent No.: US 11,029,122 B2
(45) Date of Patent: Jun. 8, 2021

(54) BOW HOLDER FOR HUNTING BLIND

(71) Applicant: Mark Ellinghuysen, Winona, MN (US)

(72) Inventor: Mark Ellinghuysen, Winona, MN (US)

(73) Assignee: Mark Ellinghuysen, Winona, MN (US)

( * ) Notice: Subject to any disclaimer, the term of this patent is extended or adjusted under 35 U.S.C. 154(b) by 0 days.

(21) Appl. No.: 16/867,254

(22) Filed: May 5, 2020

(65) Prior Publication Data
US 2020/0355461 A1 Nov. 12, 2020

Related U.S. Application Data

(60) Provisional application No. 62/843,778, filed on May 6, 2019.

(51) Int. Cl.
| | |
|---|---|
| *F41B 5/14* | (2006.01) |
| *A47F 7/00* | (2006.01) |
| *A47B 81/00* | (2006.01) |
| *E05B 73/02* | (2006.01) |
| *A01M 31/02* | (2006.01) |

(52) U.S. Cl.
CPC .......... *F41B 5/1453* (2013.01); *A47B 81/005* (2013.01); *A47F 7/0021* (2013.01); *E05B 73/02* (2013.01); *A01M 31/025* (2013.01)

(58) Field of Classification Search
CPC .... F41B 5/1453; A01M 31/025; A47B 81/00; A47B 81/005; A47F 7/024; A47F 7/0021; E05B 69/006; E05B 73/00; E05B 73/007; E05B 73/02; B25H 3/04
USPC ...... 211/85.7, 64, 66, 4, 60.1; 248/389, 690, 248/691, 309.1; 224/248, 250, 916; 124/44.5
See application file for complete search history.

(56) References Cited

U.S. PATENT DOCUMENTS

| | | | | |
|---|---|---|---|---|
| 219,921 | A * | 9/1879 | Davis | A46D 1/08 300/19 |
| 350,523 | A * | 10/1886 | Bodley | A47K 1/09 211/65 |
| 586,238 | A * | 7/1897 | King | A47K 1/09 211/66 |
| 1,206,655 | A * | 11/1916 | Belcher | A47L 13/512 248/113 |
| 2,488,664 | A * | 11/1949 | Gruber | B25H 3/04 211/60.1 |
| 2,612,336 | A * | 9/1952 | Tuttle | B25G 3/00 248/691 |
| 2,911,173 | A * | 11/1959 | Deppe | A47L 13/512 248/113 |
| 3,116,808 | A | 1/1964 | Riley | |

(Continued)

OTHER PUBLICATIONS

Notice of Allowance in U.S. Appl. No. 16/543,184, dated Apr. 27, 2020.

*Primary Examiner* — Jennifer E. Novosad
(74) *Attorney, Agent, or Firm* — Foley & Lardner LLP

(57) ABSTRACT

A bow holder includes a bow interface member and a locking member. The locking member is coupled to the bow interface member. The bow holder is configured to receive a limb of a hunting bow between the locking member and the bow interface member to detachably couple the hunting bow to the bow interface member. The locking member and the bow interface member together are configured to support the hunting bow in an upright position above the bow interface member.

14 Claims, 4 Drawing Sheets

(56) References Cited

U.S. PATENT DOCUMENTS

| | | | | |
|---|---|---|---|---|
| 3,209,442 A * | 10/1965 | Watson | F41B 5/1449 | 29/235 |
| 3,465,928 A * | 9/1969 | Osterholm | F41B 5/063 | 224/629 |
| 3,485,320 A | 12/1969 | Jones | | |
| 4,146,204 A * | 3/1979 | Thalenfeld | A47F 5/0807 | 248/220.41 |
| 4,286,717 A * | 9/1981 | Liesinger | B25H 3/04 | 211/70.6 |
| 4,474,296 A * | 10/1984 | Hartman | F41B 5/14 | 124/23.1 |
| 4,519,566 A * | 5/1985 | Manzi | B25H 3/04 | 248/110 |
| 4,542,873 A * | 9/1985 | Matherly | F41B 5/14 | 124/23.1 |
| 4,696,461 A * | 9/1987 | Zelinski | B25B 11/00 | 211/64 |
| 4,729,363 A * | 3/1988 | Skyba | F41B 5/14 | 124/23.1 |
| 4,880,192 A * | 11/1989 | Vom Braucke | A47L 13/512 | 248/110 |
| 4,909,467 A * | 3/1990 | Shan-Pao | A47G 23/0241 | 211/75 |
| 4,936,531 A * | 6/1990 | Bauser | B60N 3/00 | 211/64 |
| 5,009,283 A | 4/1991 | Prejean | | |
| 5,039,052 A * | 8/1991 | Carafice | F41B 5/14 | 248/309.1 |
| 5,063,678 A * | 11/1991 | Simo | F41G 1/467 | 33/265 |
| 5,183,231 A * | 2/1993 | Pellerin | F41B 5/14 | 124/23.1 |
| 5,186,276 A | 2/1993 | Craig | | |
| 5,297,766 A * | 3/1994 | Hoffman | A47J 47/16 | 248/205.3 |
| 5,310,150 A * | 5/1994 | Fecko | F41B 5/14 | 248/217.4 |
| 5,411,191 A * | 5/1995 | Bunn, Jr. | A47F 7/0021 | 211/70.6 |
| 5,482,241 A | 1/1996 | Oglesby | | |
| 5,619,981 A * | 4/1997 | Breedlove | F41B 5/1426 | 124/86 |
| 5,769,372 A | 6/1998 | Klosterman | | |
| 5,775,658 A * | 7/1998 | Englehardt | F41B 5/14 | 124/23.1 |
| 5,967,475 A | 10/1999 | Johnson | | |
| 6,035,842 A * | 3/2000 | Bradley | F41B 5/143 | 124/44.5 |
| 6,202,665 B1 | 3/2001 | O'Hare | | |
| 6,336,520 B1 | 1/2002 | Amacker | | |
| 6,457,685 B1 * | 10/2002 | Taylor | F41A 23/18 | 124/41.1 |
| 6,488,018 B2 * | 12/2002 | Hulm | F41B 5/143 | 124/44.5 |
| 6,502,566 B1 * | 1/2003 | Achkar | F41B 5/143 | 124/44.5 |
| 6,571,916 B1 | 6/2003 | Swanson | | |
| 6,591,823 B1 * | 7/2003 | Keller | F41B 5/143 | 124/44.5 |
| 6,595,325 B2 | 7/2003 | Ulrich | | |
| 6,663,059 B1 * | 12/2003 | Warren | A01M 31/02 | 124/86 |
| 6,763,820 B1 * | 7/2004 | Pinto, Jr. | F41B 5/143 | 124/25.6 |
| 6,986,446 B2 * | 1/2006 | Murray | B60R 7/14 | 211/64 |
| 7,156,086 B1 * | 1/2007 | Wells | F41B 5/14 | 124/89 |
| 7,163,183 B2 * | 1/2007 | Sutherland | F41B 5/14 | 124/23.1 |
| 7,546,990 B1 * | 6/2009 | McGuire | B25H 3/04 | 211/70.6 |
| 7,631,754 B1 * | 12/2009 | Fickett | F41B 5/063 | 206/315.1 |
| 8,016,134 B1 * | 9/2011 | Templin | F16M 13/022 | 211/85.7 |
| 8,061,341 B2 * | 11/2011 | Hudkins | F41B 5/066 | 124/44.5 |
| 8,231,095 B2 * | 7/2012 | Bean | F41B 5/14 | 248/323 |
| D676,515 S * | 2/2013 | Mosteller | D22/107 | |
| 8,424,645 B2 * | 4/2013 | Schlipf | F41B 5/1453 | 182/230 |
| 8,439,026 B1 * | 5/2013 | Kilian | F41B 5/1469 | 124/35.2 |
| 8,678,206 B2 * | 3/2014 | Kubiniec | A47B 81/005 | 211/64 |
| 8,733,227 B1 * | 5/2014 | Ridgeway | F41A 23/18 | 89/37.13 |
| 9,585,379 B2 | 3/2017 | Dorrity | | |
| 9,938,734 B1 | 4/2018 | Garis | | |
| 10,288,216 B1 * | 5/2019 | Amanze | A47L 13/51 | |
| 10,412,954 B1 | 9/2019 | Ellinghuysen | | |
| 10,757,930 B2 * | 9/2020 | Ellinghuysen | F41A 23/18 | |
| 2002/0078988 A1 * | 6/2002 | Valpredo | E04H 15/001 | 135/90 |
| 2003/0168285 A1 | 9/2003 | Eastman, II | | |
| 2004/0149867 A1 * | 8/2004 | Johnson | F41B 5/1453 | 248/146 |
| 2005/0109891 A1 * | 5/2005 | McCuskey | A01M 31/025 | 248/122.1 |
| 2005/0167378 A1 * | 8/2005 | Scott, Jr. | A47B 81/005 | 211/64 |
| 2010/0065701 A1 * | 3/2010 | Fletcher | F41B 5/14 | 248/229.1 |
| 2011/0308887 A1 | 12/2011 | Johnson | | |
| 2012/0104196 A1 * | 5/2012 | Regina | A01M 31/02 | 248/205.1 |
| 2012/0168249 A1 | 7/2012 | Furseth et al. | | |
| 2014/0077432 A1 * | 3/2014 | Lee | B25B 5/006 | 269/75 |
| 2014/0190767 A1 | 7/2014 | Wheelington | | |
| 2014/0311828 A1 | 10/2014 | Bassett et al. | | |
| 2016/0128317 A1 | 5/2016 | Gerry | | |
| 2017/0265454 A1 | 9/2017 | Kramer | | |
| 2018/0110335 A1 | 4/2018 | O'Hagan | | |
| 2019/0055782 A1 | 2/2019 | Infalt et al. | | |
| 2019/0104728 A1 | 4/2019 | Howell, Jr. | | |

\* cited by examiner

BOW HOLDER FOR HUNTING BLIND

CROSS-REFERENCE TO RELATED PATENT APPLICATIONS

The present application claims the benefit of and priority to U.S. Provisional Patent Application No. 62/843,778, entitled "Bow Holder for Hunting Blind" and filed May 6, 2019, the entire disclosure of which is hereby incorporated by reference herein.

TECHNOLOGY

The present technology relates generally to the field of weapon support systems for hunting blinds. More specifically, this technology relates to a holder for a bow.

SUMMARY

An embodiment of the present disclosure relates to a bow holder. The bow holder includes a bow interface member and a locking member. The locking member is coupled to the bow interface member. The bow holder is configured to receive a limb of a hunting bow between the locking member and the bow interface member to detachably couple the hunting bow to the bow interface member. The locking member and the bow interface member together are configured to support the hunting bow in an upright position above the bow interface member.

Another embodiment of the present disclosure relates to a bow holder. The bow holder includes a bow interface member including an upper surface defining a recessed area. The recessed area is sized to receive a limb bolt of a hunting bow therein. The locking member is coupled to the bow interface member and extends across the upper surface. The locking member is spaced vertically apart from the upper surface to form a channel.

Another embodiment of the present disclosure relates to a hunting blind. The hunting blind includes a frame and a bow holder. The bow holder includes a bow interface member and a locking member. The bow interface member is coupled to the frame. The locking member is coupled to the bow interface member. The bow holder is configured to receive a limb of the hunting bow between the bow interface member and the locking member to detachably couple the hunting bow to the bow interface member. The locking member and the bow interface member together are configured to support the hunting bow in an upright position above the bow interface member.

DETAILED DESCRIPTION

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s).

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

Referring generally to the Figures, a bow holder 100 configured to support a bow 12 (e.g., a compound bow, recurve bow, etc.) in a firing position is shown, according to an illustrative embodiment. The bow holder 100 is coupled to a hunting blind 10. The hunting blind 10 may be a game blind, a tree stand (e.g., hunting platform), etc. In other embodiments, the bow holder 100 may be coupled to an accessory support structure for a hunting blind and/or directly to a tree or other accessory support structure that is separate from a hunting blind 10. A receiving end 102 of the bow holder 100 is detachably (e.g., removably, etc.) coupled to a bow 12. The bow holder 100 is configured to facilitate rapid engagement and/or disengagement of the bow 12 by a user with minimal interaction between the user and the bow 12 and/or the user and the bow holder 100.

Figure 1:
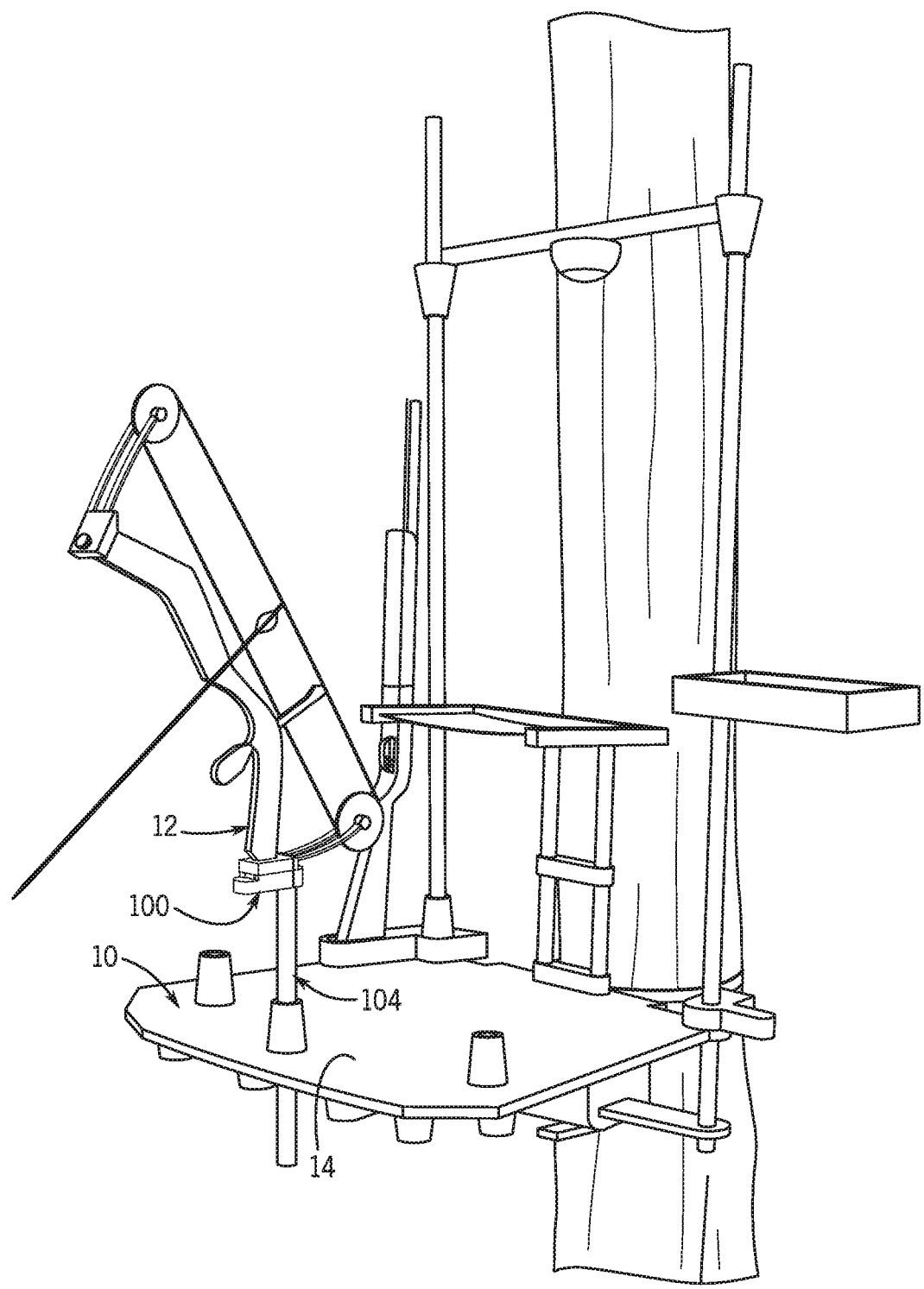
FIG. 1 is a perspective view of a hunting blind including a bow holder, according to various illustrative embodiments.
Figure 2:
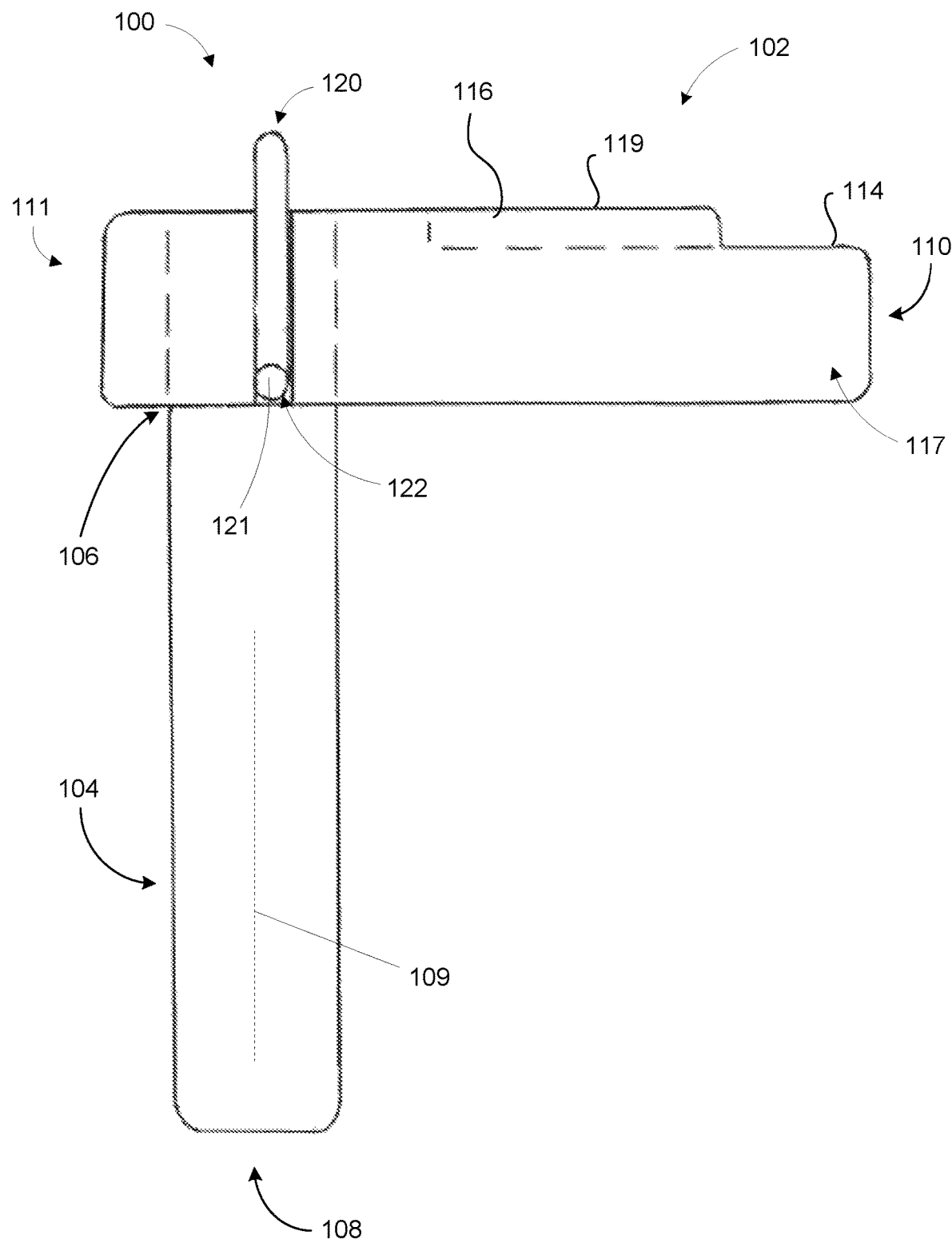
FIG. 2 is a side view of the bow holder of FIG. 1, according to an illustrative embodiment.

As shown in FIG. 1, the bow holder 100 may be coupled to one of a hunting platform (e.g., tree stand), a game or hunting blind 10, a tree-mounted accessory support system, or another accessory support structure. The bow holder 100 may be positioned substantially in front of a user such that the user may quickly access the bow 12. In other embodiments, the bow holder 100 may be positioned to a side of the user or at another location near the user for ease of access. In some embodiments, the bow holder 100 is coupled (e.g., mechanically fastened, mounted, etc.) to a helper rail of a hunting blind or platform that at least partially surrounds the user and substantially prevents the user from falling out of the hunting blind 10. As shown in FIGS. 2-6, the bow holder 100 includes a connecting member 104 (e.g., a cylindrical support pole, etc.) configured to detachably couple the bow holder 100 to the hunting blind 10. A first end 106 (e.g., lower end) of the connecting member 104 is coupled to the hunting blind 10 (e.g., a support structure of a hunting blind 10, a frame 14, etc.). A second end 108 (e.g., upper end) of the connecting member 104 opposite the first end 106 is coupled to a bow interface member 110. As shown in FIG. 2, the second end 108 is received within an opening 112 in the bow interface member 110 proximate to a first side 111 of the bow interface member 110. In other embodiments, the bow holder 100 may only include the bow interface member 110 (e.g., coupled directly to the hunting blind 10, etc.).

Figure 3:
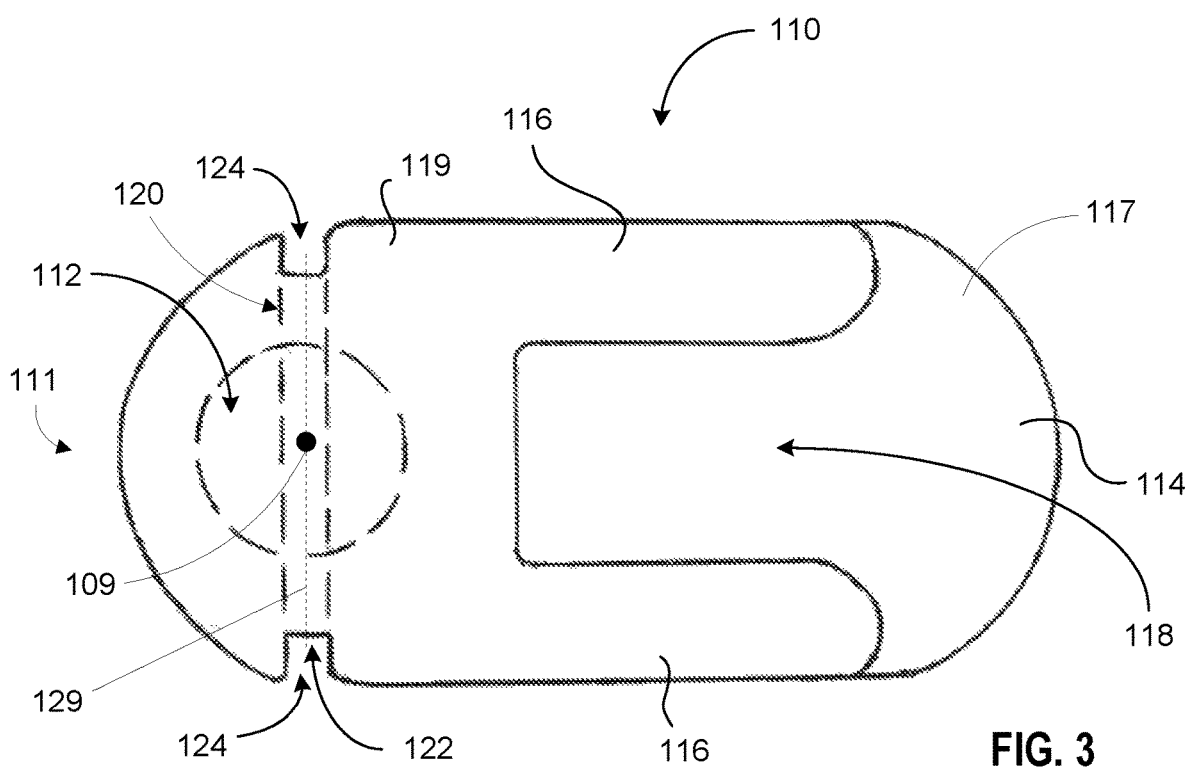
FIG. 3 is a top view of the bow holder of FIG. 1, according to an illustrative embodiment.

The bow interface member 110 is configured to engage with a bow 12 (e.g., a lower limb of the bow, etc.) and to at least partially support the bow 12 in a substantially vertical orientation (e.g., vertically relative to a ground surface and/or the floor area of the hunting blind 10, etc.). The bow interface member 110 includes a plurality of extension pieces 116 and a forward lip 117. The extension pieces 116 extend from an upper surface 114 of the bow interface member 110. The extension pieces 116 are oriented substantially parallel to one another and are spaced apart from one another forming a recessed area 118 (e.g., channel, groove, depression, etc.) therebetween. As shown in FIG. 3, the recessed area 118 has a rectangular shape when viewed from above the bow interface member 110. In other embodiments, the shape of the recessed area 118 may be different. The recessed area 118 is sized to receive a limb bolt of a bow 12 and/or another portion of the bow 12 that protrudes beyond the lower limb. A substantially planar upper surface 119 of each of the extension pieces 116 is configured to engage with and support the lower limb of the bow 12. The extension pieces 116 stabilize the bow 12 in a substantially perpendicular orientation relative to the upper surface 119. The forward lip 117 extends forward of the extension pieces 116 (e.g., protrudes beyond a forward end of the extension pieces 116). An upper surface of the forward lip 117 is co-planar with a lower surface of the recessed area 118. As shown in FIG. 3, a forward end of each of the extension pieces 116 is rounded to help guide a limb bolt of the bow 12 into the recessed area 118.

Figure 4:
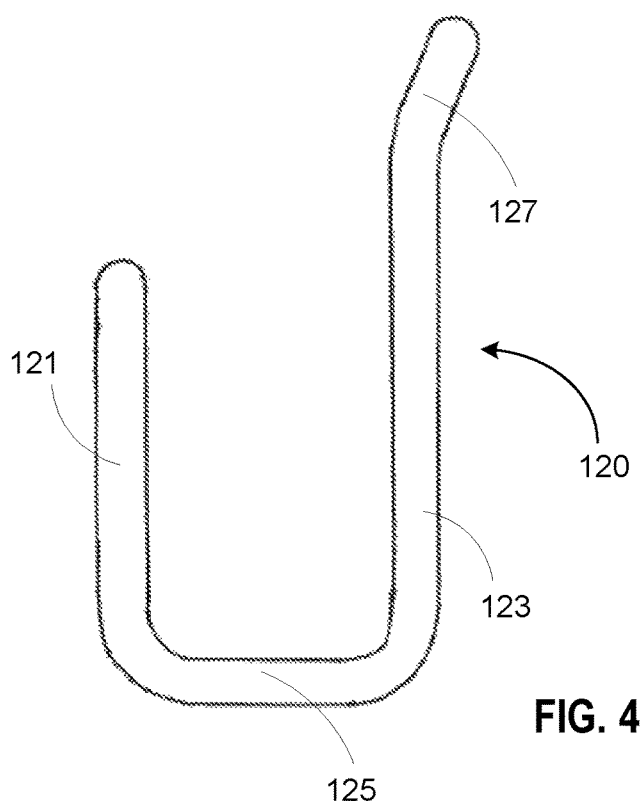
FIG. 4 is a front view of a locking member for a bow holder, according to an illustrative embodiment.
Figure 6:
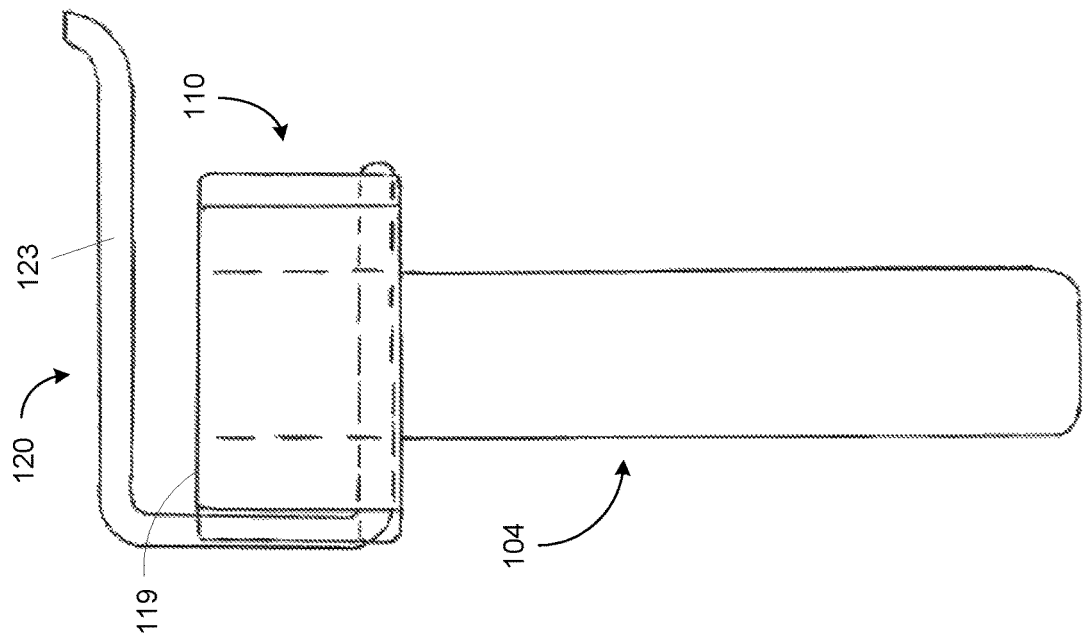
FIG. 6 is a rear view of the bow holder of FIG. 1, according to an illustrative embodiment.
Figure 5:
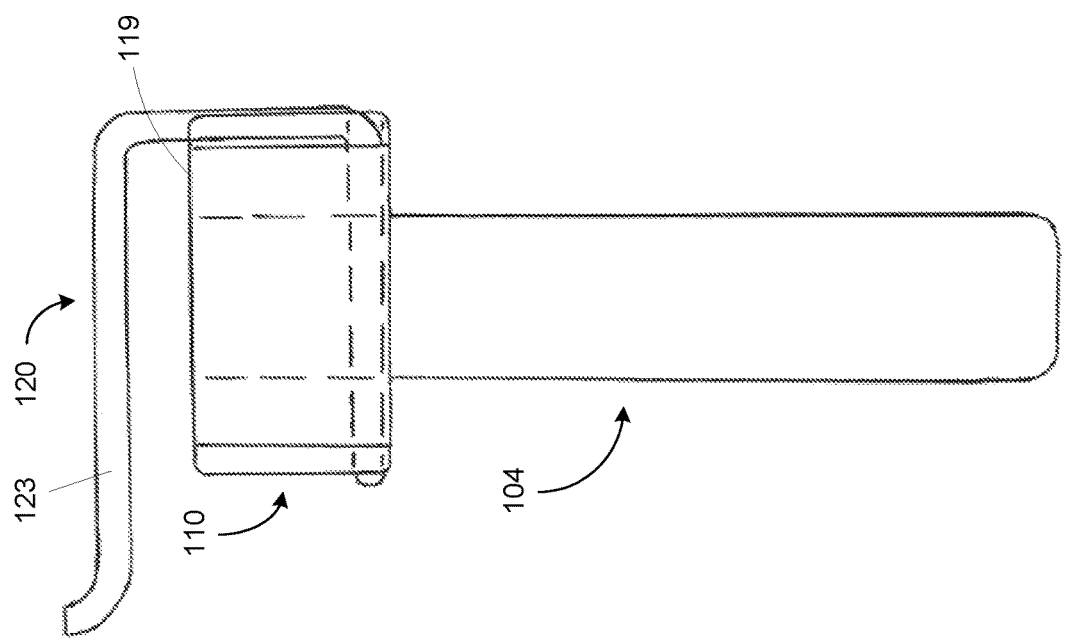
FIG. 5 is a front view of the bow holder of FIG. 1, according to an illustrative embodiment.

As shown in FIGS. 4-6, the bow holder 100 also includes a locking member 120 that is detachably coupled to the bow interface member 110. The locking member 120 is inserted through an opening 122 (e.g., hole, cross-bore, etc.) that extends through the bow interface member 110 and the connecting member 104 in a substantially perpendicular orientation relative to the upper surface 119 of the bow interface member 110 (e.g., perpendicular to a central axis through the connecting member 104, etc.). In some embodiments, the bow holder 100 includes multiple openings 122 to allow the locking member 120 to be repositioned to accommodate different bow sizes (e.g., up or down depending on the thickness of the limb of the bow, or side to side to accommodate bows having different limb styles, etc.). The locking member 120 detachably couples the bow interface member 110 to the connecting member 104. In particular, the locking member 120 is configured to wrap around an upper surface of the limb of the bow 12 such that the limb is "sandwiched" or otherwise disposed between the locking member 120 and the bow interface member 110. As shown in FIGS. 5-6, the locking member 120 extends across the upper surface 119 such that the locking member 120 (e.g., second leg 123) substantially covers a portion of the upper surface 119. In the embodiment of FIG. 4, the locking member 120 is a retaining clip (e.g., a pin made from bent metal wire, etc.) having a "U" shaped profile. The locking member 120 includes a first leg 121 and a second leg 123 that is oriented substantially parallel to the first leg 121 and spaced apart from the first leg 121. The first leg 121 and the second leg 123 are connected by a cross-leg 125. As shown in FIG. 4, the cross-leg 125 extends between the first leg 121 and the second leg 123 in a direction that is substantially perpendicular to the first leg 121 and the second leg 123 such that the locking member 120 has a rectangular profile with rounded corners. In other embodiments, the cross-leg 125 is curved, bent, or otherwise formed into a "U" shape or another suitable shape. A length of the second leg 123 is greater than a length of the first leg 121. As shown in FIG. 4, an outer end 127 of the second leg 123 curves away from the first leg 121, which, advantageously, provides lead-in to facilitate engagement between the limb of the bow 12 and the locking member 120. As shown in FIG. 3, the opening 122 is sized to receive the first leg 121 therein to couple the locking member 120 to the bow interface member 110. The second leg 123 is spaced vertically apart from the upper surface 119 of the extension pieces 116 forming a channel (e.g., a receiving channel, etc.) sized to receive the limb of the bow 12 therein. The design of the locking member 120 of FIG. 4 is shown for illustrative purposes only and various alternatives and combinations are possible without departing from the inventive concepts described herein. In other embodiments, the locking member 120 may include a clip, latch, toggle, or another mechanical interface configured to secure the bow 12 to the bow interface member 110.

As shown in FIG. 3, the bow interface member 110 includes two slots 124 oriented parallel to a central axis 109 of the connecting member 104. The slots 124 are diametrically disposed on opposite ends of the bow interface member 110. The slots 124 are configured to receive the locking member 120 therein to prevent rotation of the locking member 120 with respect to the bow interface member 110. As shown in FIG. 3, each of the slots 124 is aligned with the opening 122 such that a central axis through the slots 124 is aligned with a central axis 129 through the opening 122. In other words, a portion of the locking member 120 nestably engages the slots 124 to substantially prevent rotation of the locking member 120 once engaged with the bow interface member 110. Among other benefits, including slots 124 on both sides of the bow interface member 110 allows the locking member 120 to be inserted into either side of the bow interface member 110, which, advantageously, makes the bow holder 100 adaptable to both left and right handed users (the bow holder 100 may be adjusted to allow removal of the bow 12 from either side of the bow holder 100).

Returning now to FIG. 1, the bow holder 100 is configured to secure the bow 12 in a firing position above the bow holder 100 (e.g., upright position with the bow upright and with a bow string positioned closer to a user than a grip of the bow 12) to reduce time required to disengage the bow 12 from the bow holder 100 and take a shot at passing game or quarry. According to an exemplary embodiment, the bow holder 100 is configured to position the bow 12 just forward of the user. To access and release the bow 12, the user simply reaches forward to grasp the handle and/or the bow string. The user rotates the bow 12 (e.g., 90° or as far as needed to free the bow from the locking member 120) and lifts the bow 12 out and away from the bow holder 100. In the embodiments of FIGS. 1-6, the user rotates the bow 12 about a reference line that is substantially parallel to the axis of the connecting member 104. It will be appreciated that the shape and arrangement of the locking member 120 and bow interface member 110 may vary without departing from the inventive concepts disclosed herein.

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can of course vary. It is also to be understood that the terminology used herein is for the purpose of describing particular embodiments only, and is not intended to be limiting.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

Other embodiments are set forth in the following claims.

What is claimed is:

1. A bow holder, comprising:
a bow interface member, an upper surface of the bow interface member defining a recessed area extending in a first direction; and
a locking member coupled to the bow interface member, the locking member extending in a second direction that is substantially perpendicular to the first direction, the locking member comprising a first leg and a second leg that is oriented substantially parallel to the first leg and is spaced apart from the first leg, the first leg engaged with the bow interface member, the second leg extending across the upper surface of the bow interface member and spaced thereabove such that the second leg covers a portion of the upper surface, the bow holder configured to receive a limb of a hunting bow between the locking member and the bow interface member to detachably couple the hunting bow to the bow interface member, the locking member and the bow interface member together are configured to support the hunting bow in an upright position above the bow interface member.

2. The bow holder of claim 1, wherein the recessed area is sized to receive a limb bolt of the hunting bow therein.

3. The bow holder of claim 1, wherein the bow interface member comprises a plurality of extension pieces extending from the upper surface, wherein the plurality of extension pieces are substantially parallel to one another and are spaced apart to form the recessed area.

4. The bow holder of claim 1, wherein the locking member is a retaining clip having a "U" shaped profile.

5. The bow holder of claim 1, wherein an outer end of the second leg curves away from the first leg.

6. The bow holder of claim 1, wherein the locking member and the upper surface of the bow interface member together form a channel sized to receive the limb of the hunting bow therein.

7. The bow holder of claim 1, wherein the bow interface member comprises an opening and a slot, wherein the locking member is received within the opening and engaged with the slot, and wherein the slot substantially prevents rotation of the locking member.

8. The bow holder of claim 1, wherein the bow interface member comprises a pair of slots disposed on opposite sides of the bow interface member and extending in a substantially perpendicular orientation relative to the upper surface of the bow interface member.

9. The bow holder of claim 1, wherein the bow interface member comprises an opening and a slot, the opening extending through the bow interface member in a substantially perpendicular orientation relative to the first direction, the slot aligned with the opening and extending in a substantially perpendicular orientation relative to a central axis of the opening.

10. The bow holder of claim 1, wherein the bow interface member comprises a plurality of extension pieces and a forward lip, the plurality of extension pieces extending from the upper surface of the bow interface member in substantially perpendicular orientation relative to the upper surface, the forward lip extending forward of the plurality of extension pieces.

11. The bow holder of claim 1, further comprising a connecting member coupled to the bow interface member and configured to detachably couple the bow interface member to a hunting blind.

12. A blind, comprising:
a frame; and
a bow holder, comprising:
a bow interface member coupled to the frame, an upper surface of the bow interface member defining a recessed area extending in a first direction; and
a locking member coupled to the bow interface member, the locking member extending in a second direction that is substantially perpendicular to the first direction, the locking member comprising a first leg and a second leg that is oriented substantially parallel to the first leg and is spaced apart from the first leg, the first leg engaged with the bow interface member, the second leg extending across the upper surface of the bow interface member and spaced thereabove such that the second leg covers a portion of the upper surface, the bow holder configured to receive a limb of a hunting bow between the bow interface member and the locking member to detachably couple the hunting bow to the bow interface member, the locking member and the bow interface member together are configured to support the hunting bow in an upright position above the bow interface member.

13. The blind of claim 12, wherein the recessed area is sized to receive a limb bolt of the hunting bow therein.

14. The blind of claim 12, wherein the bow interface member comprises a plurality of extension pieces extending from the upper surface, wherein the plurality of extension pieces are substantially parallel to one another and are spaced apart to form the recessed area.

\* \* \* \* \*